United States Patent [19]
Homma et al.

[11] Patent Number: 5,671,903
[45] Date of Patent: Sep. 30, 1997

[54] HEAT TREATMENT APPARATUS AND VALVE DEVICE FOR USE IN THE SAME

[75] Inventors: Kenji Homma; Hironobu Nishi, both of Kanagawa-ken, Japan

[73] Assignee: Tokyo Electron Tohoku Kabushiki Kaisha, Japan

[21] Appl. No.: 365,460

[22] Filed: Dec. 28, 1994

[30] Foreign Application Priority Data

Dec. 29, 1993 [JP] Japan .................................. 5-352739
Dec. 29, 1993 [JP] Japan .................................. 5-352740

[51] Int. Cl.⁶ .................................................. F16K 31/44
[52] U.S. Cl. .......................... 251/69; 251/264; 251/273; 251/335.3
[58] Field of Search .................. 251/335.3, 264, 251/273, 359, 69, 65; 137/625.3

[56] References Cited

U.S. PATENT DOCUMENTS

| | | | |
|---|---|---|---|
| 2,630,832 | 3/1953 | Lutherer | 251/69 |
| 2,638,929 | 5/1953 | Delany et al. | 251/121 |
| 2,875,616 | 3/1959 | Marks | 251/69 |
| 3,084,901 | 4/1963 | Thorburn | 251/335.3 |
| 3,422,329 | 1/1969 | Anderson et al. | 251/69 |
| 4,793,589 | 12/1988 | Eldredge et al. | 137/625.3 |
| 5,113,908 | 5/1992 | Steinke | 137/625.3 |
| 5,165,652 | 11/1992 | Nicolaisen | 251/335.3 |

FOREIGN PATENT DOCUMENTS

| | | | |
|---|---|---|---|
| 3127913 | 1/1983 | Germany | 251/65 |
| 56-35781 | 8/1981 | Japan . | |
| 5-99360 | 4/1993 | Japan . | |

*Primary Examiner*—Edward K. Look
*Attorney, Agent, or Firm*—Beveridge, DeGrandi, Weilacher & Young, L.L.P.

[57] ABSTRACT

The present invention relates to a heat treatment apparatus, specifically a valve device for use in an exhaust system of a low pressure heat treatment furnace, which comprises urging device for urging a valve body in a valve closing direction, and a drive unit for opening/closing the valve body against an urging force of the urging device. An interconnection releasing mechanism is provided between the driving unit and the valve rod of the valve body, the interconnection releasing mechanism connecting both with each other, and releasing their connection in an emergency. Thus, an exhaust system of the low pressure heat treatment furnace is instantaneously shut off in an emergency to prevent reverse flow of exhaust gas into the furnace. An evacuation fine adjustment gap is defined between the periphery of the valve body and that of the valve casing for facilitating evacuation control.

3 Claims, 6 Drawing Sheets

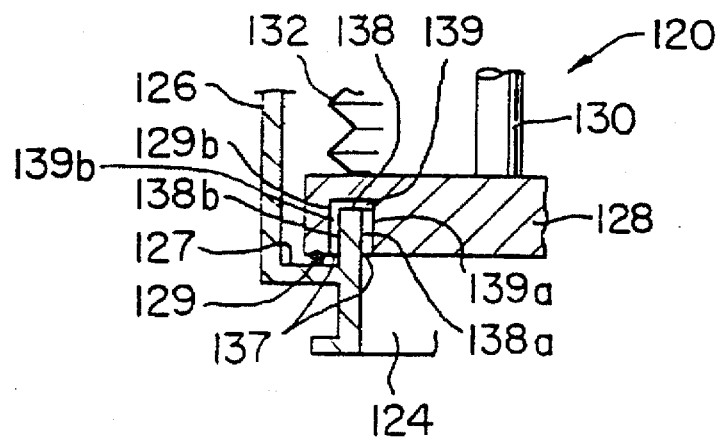
F I G. 6
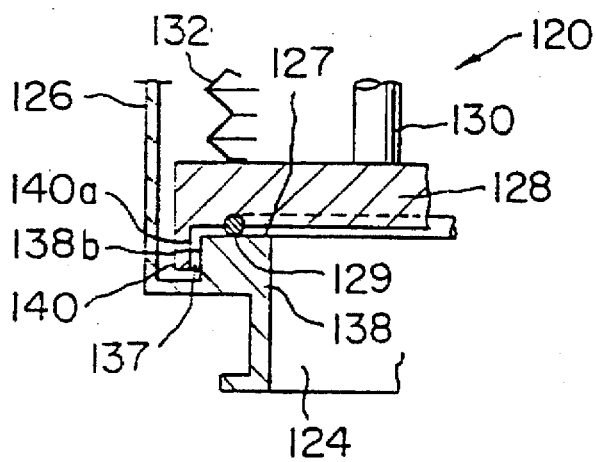
F I G. 7
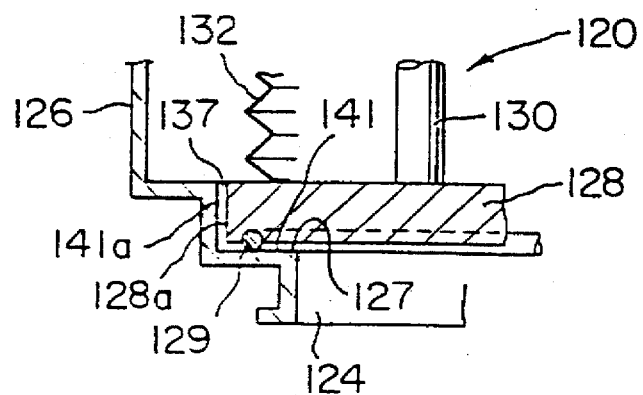
F I G. 8

HEAT TREATMENT APPARATUS AND VALVE DEVICE FOR USE IN THE SAME

BACKGROUND OF THE INVENTION

The present invention relates to a heat treatment apparatus, and a valve device for use in the heat treatment apparatus.

As a heat treatment apparatus for objects to be treated is conventionally known, for example, a low pressure heat treatment furnace which is used for low pressure CVD (Chemical Vapor Deposition), etc. in a process for fabricating the objects to be treated, e.g., semiconductor wafers. The low pressure heat treatment furnace includes a processing gas supply system which supplies processing gases into the furnace, and an exhaust system including an evacuation pump which exhausts or evacuates the interior of the furnace, and a valve device for controlling internal pressures of the furnace.

In such low pressure heat treatment furnace, in emergencies that electric power is suddenly stopped in its operation of the furnace, and due to occurrence of an abnormal condition the electric power source is disconnected to forcedly stop its operation, and other cases, it is necessary to close a valve device of the exhaust system at once for preventing exhaust gas from flowing reversely into the furnace under a lower pressure through the exhaust system with an evacuation pump stopped to contaminate the interior of the furnace and semiconductor wafers therein.

But the valve device of the exhaust system of such low pressure heat treatment furnace is manually operated or generally driven by an electric motor. Even if a backup electric power source, for example, is used, it will take time to close the valve device, and it will be difficult to close the exhaust system instantaneously in an emergency. For this reason, the exhaust system requires an air pressure-type emergency shut-off valve in addition to the valve device. This unavoidably adds to equipment costs, equipment spaces and piping resistances.

As shown in FIG. 10, such low pressure heat treatment furnace 201 is connected to an exhaust system 218 which establishes a low pressure atmosphere in the furnace in addition to a processing gas supply system (not shown) which feeds processing gases into the furnace. The exhaust system 218 has the following structure for the pressure control to maintain the interior of the furnace under a required processing pressure.

As exemplified in FIG. 10. the exhaust system 218 has an inlet port 224 and an outlet port 225, and a pipe 219 of a set diameter (bore), e.g., about 80 mm. In the pipe 219 there are inserted a main opening/closing valve 243 in the form of an angle valve, a main control valve 244 in the form of a butterfly valve, and an evacuation pump 221 in the stated order. A bypass pipe 245 of a small diameter, e.g., about 9 mm, which bypasses the main opening/closing valve 243 is connected to the pipe 219. In the bypass pipe 245 there are inserted an auxiliary opening/closing valve 246 in the form of an angle valve and an auxiliary pressure control valve 247 in the form of a needle valve in the stated order. As shown in FIG. 11, the main opening/closing valve 243 and the auxiliary opening/closing valve each comprise a valve casing 226 with a valve seat 226, and a valve body 228 which is to be rested on the valve seat 227 and is to be adjustably left from the valve seat 227. The main and the auxiliary opening/closing valves are only for opening/closing because it is difficult to control a pressure in the furnace by adjusting a fine gap between the valve seat 227 and the valve body 228.

To place the interior of the furnace under a required processing pressure, e.g., about 400 Torr, first the main opening/closing valve 243 of FIG. 10 is closed with the main pressure control valve 244, the auxiliary opening/closing valve 246 and the auxiliary pressure valve 247 opened to evacuate the interior of the furnace down to a set pressure, e.g., about 10 Torr by slow vacuum through the smaller-bore bypass pipe 245. Then with the main opening/closing valve 243 opened and with the auxiliary opening/closing valve 246 and the auxiliary control valve 247 closed, the interior of the furnace is highly evacuated to, e.g., 0.5 Torr through the pipe 219, and next while processing gases are being fed into the furnace, with the main opening/closing valve 243 closed and the auxiliary opening/closing valve 246 opened the interior of the furnace is low evacuated to a processing pressure, e.g., about 400 Torr. To highly evacuate the interior of the furnace to a processing pressure of, e.g., about 1 Torr, the above-described change-over of the valves following the evacuation is not conducted, but the pressure control is conducted by the main opening/closing valve 244.

But the above-described exhaust system of the low pressure heat treatment furnace needs the bypass pipe, and a number of valves for opening/closing the exhaust system, high evacuation control, slow vacuum and low evacuation control, which disadvantageously adds to equipment costs and equipment spaces and makes the control complicated.

SUMMARY OF THE INVENTION

A first object of the present invention is to provide heat treatment apparatus with a valve device with an emergency shut-off function for use in the heat treatment apparatus which is a pressure control valve and can instantaneously shut off, in an emergency, an exhaust system of a low pressure heat treatment furnace, can dispense with an air-pressure emergency shut-off valve, and can reduce equipment costs and equipment spaces, and piping resistances.

To achieve the above-described object, the present invention relates to a valve device for use in an exhaust system of a heat treatment furnace and comprises a valve body to be rested on a valve seat in a valve closing direction and to be left from the valve seat in a valve opening direction by sliding of valve rod gas-tightly passed through a valve casing; urging means which urges the valve body in the valve closing direction; a drive unit which opens/closes the valve body through the valve rod against an urging force of the urging means; an interconnection releasing mechanism disposed between the drive unit and the valve rod, the interconnection releasing mechanism bringing the valve rod and the drive unit into interconnection with each other, and releasing the connection in an emergency.

According to the present invention, the valve body is opened/closed by the drive unit through the valve rod against an urging force of the urging means. In an emergency the interconnection between the drive unit and the valve rod is released by the interconnection releasing mechanism, and the valve body is automatically and quickly closed by the urging means. Thus, the valve device, which is a pressure control valve, can instantaneously shut off the exhaust system of the heat treatment furnace.

Accordingly the exhaust system does not require an air pressure emergency shut-off valve. Equipment cost and equipment spaces are accordingly reduced, and the exhaust system can have low piping resistance, with a result of higher operational efficiency.

Another object of the present invention is to a heat treatment apparatus with an opening variable valve device for use in a low pressure heat treatment furnace which can solve the above-described problems, and can conduct, with a single valve, opening/closing of the exhaust system, high evacuation control, slow vacuum, and low evacuation control, and furthermore can reduce equipment cost and equipment spaces, and simplify control.

To achieve the above-described object, the present invention relates to a opening variable valve device for use in the exhaust system of a low pressure heat treatment furnace, and comprises a valve seat formed in a valve casing, a valve body to be rested on a valve seat in a valve closing direction and to be left from the valve seat in a valve opening direction by sliding of valve rod gas-tightly passed through the valve casing, a valve body circumferential wall formed around the valve body and normal to a direction of movement of the valve body, a valve casing circumferential wall formed in the valve casing, opposed to the valve body circumferential wall, and an evacuation fine adjustment gap defined between the valve body circumferential wall and the valve casing circumferential wall.

According to the present invention, a state in which the valve body is rested on a valve seat (the valve is closed), a state in which the valve body is left from the valve seat (the valve is opened), state in which the valve body is moved with a stroke of the fine adjustment gap (slow vacuum and low evacuation control), and a state in which the valve body is moved outside the stroke of the fine adjustment gap are available. Thus, by using a single valve, the opening/closing of the exhaust system, high evacuation control, slow vacuum and low evacuation control can be conducted. Equipment costs and equipment spaces can be reduced, and control can be simplified.

BRIEF DESCRIPTION OF THE DRAWINGS

FIG. 6 is a partial vertical sectional view of a variation of the evacuation fine adjustment gap of the opening variable valve device of FIG. 5.

FIG. 7 is a partial vertical sectional view of a different variation of the evacuation fine adjustment gap of the opening variable valve device of FIG. 5.

FIG. 8 is a partial vertical sectional view of a different variation of the evacuation fine adjustment gap of the opening variable valve device of FIG. 5.

DETAILED DESCRIPTION OF PREFERRED EMBODIMENTS

A first embodiment of the present invention will be explained with reference to the drawings attached hereto.

Figure 1:
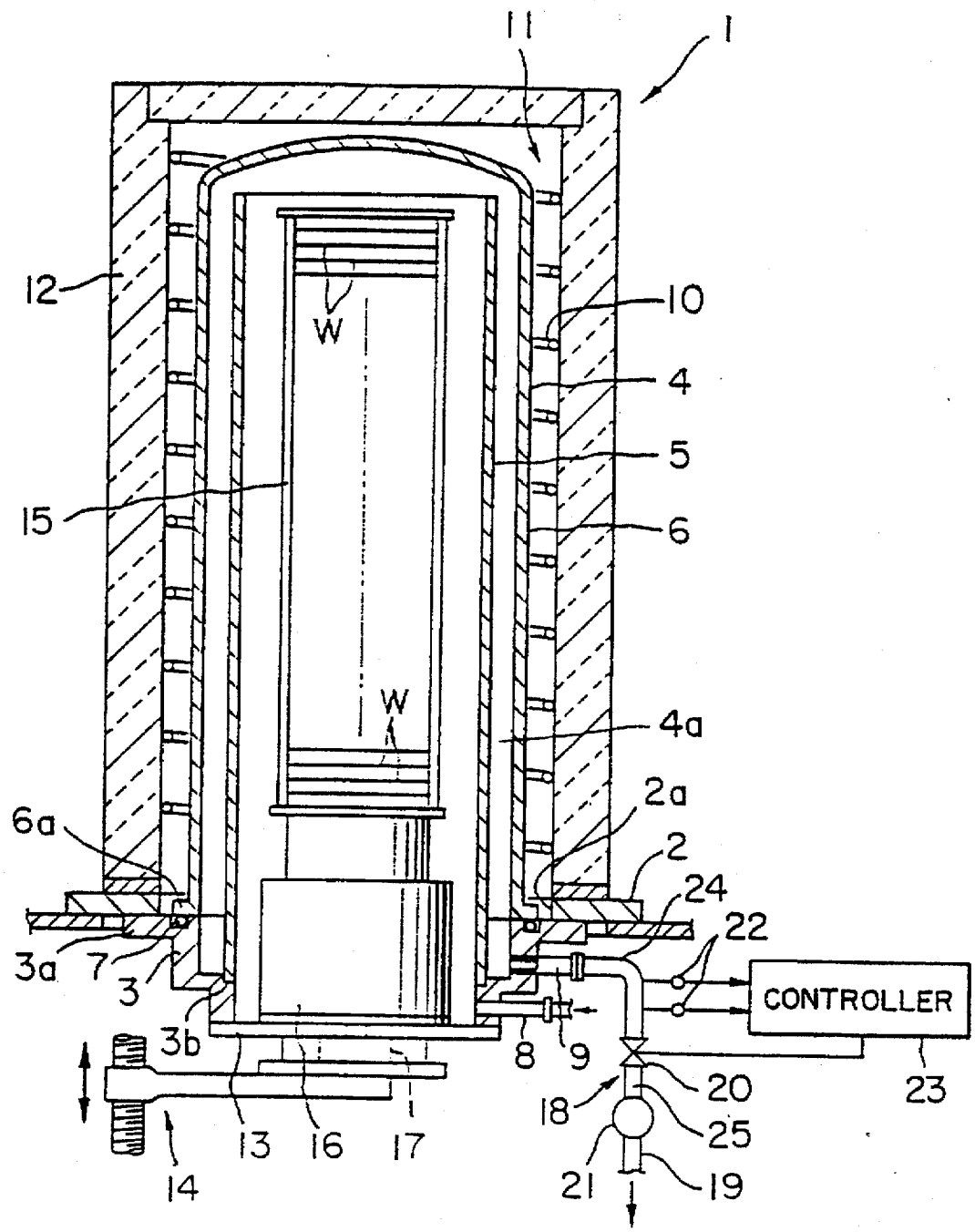
FIG. 1 is a vertical sectional view of the heat treatment device according to the present invention.

First, a low pressure heat treatment furnace the emergency shut-off valve according to the first embodiment is applied to will be explained. As shown in FIG. 1, this heat treatment furnace is of vertical type for forming films on objects to be treated, semiconductor wafers W by low pressure CVD. The low pressure heat treatment furnace 1 includes a horizontal base plate 2 of, e.g., stainless steel, with a circular opening 2a in the center thereof.

A manifold 3 in the shape of a short cylinder of, e.g., made of stainless steel, having a flange on the top thereof is detachably secured to the underside of the base plate 2 by bolts coaxially with the opening 2a. A reaction tube 4 as a treatment furnace 1 which is made of a heat resistant material, e.g., quartz is mounted on the manifold 3. The reaction tube 4 has a double tubular structure of an inner tube 5 having the upper and the lower ends opened, and an outer tube 6 having the upper end closed and the lower end outwardly opened which the inner and the outer tubes are arranged conical with each other.

The outer tube 6 is rested on the flange 3a on the upper end of the manifold 3 gas-tightly through an O-ring 7 as sealing means of a heat resistant and corrosion resistant material, e.g., fluoro-rubber. The inner tube 5 is rested on a smaller-diameter step 3b formed on the inside circumferential surface substantially at the middle of a height thereof. In the manifold 3 there are formed an inlet port 8 and an outlet port 9. The inlet port 8 communicates the interior of the inner tube 5 with the outside of the heat treatment furnace 1 and is connected to a processing gas supply system which feeds processing gases from processing gas sources into the reaction tube 4. The outlet port 9 communicates an annular space 4a between the inner and the outer tubes 5, 6 with the outside of the heat treatment furnace 1 and is connected to an exhaust system 18 which exhausts or evacuates the interior of the reaction tube 4.

Around the reaction tube 4 there is provided a heating unit 11 in the form of a coil or others of heating wires 10 of, e.g., kanthal wires, which heats the interior of the reaction tube 4 up to, e.g., 800°–1200° C. The heating unit 11 is covered with an outer shell (not shown) through a heat insulating material 12. The heating unit 11, the heat insulating material 12 and the outer shell are rested on the base plate 2.

A cap body 13 of, e.g., made of stainless steel, is provided below the manifold 3 movably up and down by a lift mechanism 14 and opens/closes an opening in the bottom thereof. On the cap body 13 there is mounted a wafer boat 15 through a heat insulating cylinder 16, which holds a number (e.g., about 150 sheets) of semiconductor wafers W horizontally on multi-steps at a vertical interval. The cap body 13 has a rotary mechanism 17 for rotating the heat insulating cylinder 16.

The exhaust system 18 comprises a stainless pipe 19 of a set diameter, e.g., an about 80 mm. In this pipe 19 there are inserted an emergency shut-off valve device 20 and an evacuation pump 21 in the stated order. A pressure sensor 22 is provided upstream of the valve device 20. Detected values given by the pressure sensor 22 are fed back so that a controller 23 controls the opening degree of the emergency shut-off valve device 20. The pressure sensor 22 comprises two sensors having different detection ranges from each other, e.g., a 0–1-Torr range and a 0–1000 Torr range. The pressure sensor 22 comprises one sensor as long as the sensor can detect a wide range of pressures with high precision.

Figure 2:
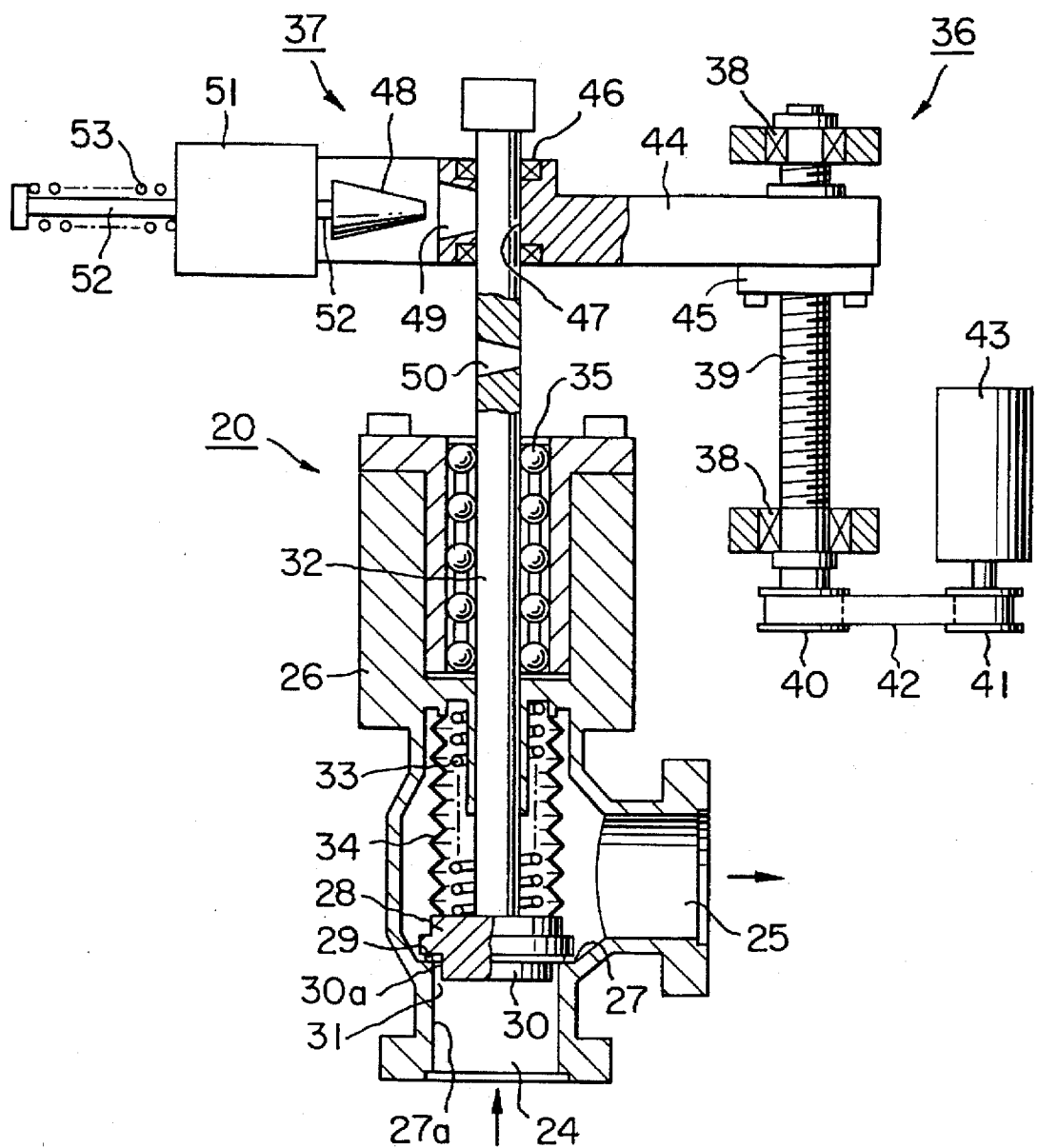
FIG. 2 is a vertical sectional side view of a major part of the emergency shut-off valve device according to a first embodiment for use in an exhaust system of the heat treatment apparatus of FIG. 1.

As shown in FIG. 2, the valve device 20 includes an angle valve-shaped valve casing 26 having an exhaust inlet port 24 in the bottom thereof and an exhaust outlet port 25 in one side thereof. A flat valve seat 27 is formed in the valve casing 26 at an inner part of the inlet port 224. A valve body 28 is provided vertically movably to be rested on the valve seat 27 and left from the same. The valve casing 26 and the valve body 28 are formed of a heat resistance and corrosion resistant material, e.g., stainless steel. An O-ring 29 of, e.g., fluoro-rubber is provided as sealing means on a part of the valve body 28 to be rested on the valve seat 27.

The valve body 28 is formed in the shape of a disc, and has a convexity 30 of circular section formed on the bottom thereof, which is fit into the valve seat 27. A gap 31 for fine adjustment of low evacuation control is to be defined between the outer circumferential surface 30a of the convexity 30 and the inside circumferential surface 27a of the valve seat 27. A conductance of a vacuum pressure in the fine adjustment gap 31 is proportional of a cross-sectional area of the gap 31 and is inversely proportional to a length of the gap 31. By making use of this, the displacement of the valve body 28 is adjusted in a range of a length of the gap 31, whereby the low evacuation control is conducted in a range of, e.g., 300–760 Torr. The displacement of the valve body 28 is adjusted between a position thereof where a cross-sectional area between the valve body 28 and the valve seat 27 exceeds a cross-sectional area of the fine adjustment gap 31, and a position thereof where a maximum opening is available (a position about ⅔ a distance from the valve seat surface in the valve casing), whereby the pressure control can be conducted between medium evacuation and high evacuation. A maximum opening of the valve can reduce a pressure down to, e.g., about $3-10^{-3}$ Torr, depending on a capacity of the evacuation pump 21.

A valve rod 32 of suitable sectional shape which is not rotatable is erected at the center of the upper surface of the valve body 28. An upper part of the valve rod 32 is passed outside through the top of the valve casing 26. A coil spring 33 is provided between the valve body 28 and the upper end of the interior of the valve casing with the valve rod passed therethrough as urging means for urging the valve body 28 against the valve seat 27 in the valve closing direction. A bellows 34 of stainless steel is provided by welding between the upper end of the valve body 28 and the upper end of the interior of the valve chamber 26, enclosing the valve rod 32 and the coil spring 33 as means which allows displacement of the valve body 28 but seals the part where the valve rod 32 is passed through. A bearing 35 (e.g., ball spline) is provided in an upper part of the interior of the valve casing 26 for axially movably supporting the valve rod 32.

A drive unit 36 is connected to a part of the valve rod 32 extended outside for opening/closing the valve body 28 against an urging force of the coil spring through the valve rod 32. An interconnection release mechanism 37 is provided between the drive unit 36 and the valve rod 32, which interconnects the valve rod 32 and the drive unit 36 and releases the interconnection between the two in an emergency. The drive unit 36 includes a screw rod 39 in form of, e.g., a ball screw, provided parallel with the valve rod 32 on a fixed part, e.g., on a outside surface of the valve casing 26, journalled by a pair of bearings 38. To one end of the screw rod 39 there is connected through toothed pulleys 40, 41 and a toothed belt 42 an electric motor, e.g., a pulse (servo) motor 43 which can finely adjust an opening of the valve body 28 and can be feedback controlled.

An output arm 44 is provided on the screw rod 39 through a nut 45 and is moved in the axial direction of the valve rod 32. The output arm 44 has a rod hole 47 through which the valve rod 32 is inserted through a bearing 46 movably in the axial direction of the valve rod 32. A substantially conical lock pin hole 49, 50 is radially formed both in the output arm 44 and in the valve rod 32 so that a substantially conical lock pin 48 is to be received both in the output arm 44 and in the valve rod 32. On the output arm 44 there is provided a solenoid 51 which is de-energized in an emergency to disengage the lock pin 48 out of the lock pin hole 49 50.

Figure 3:
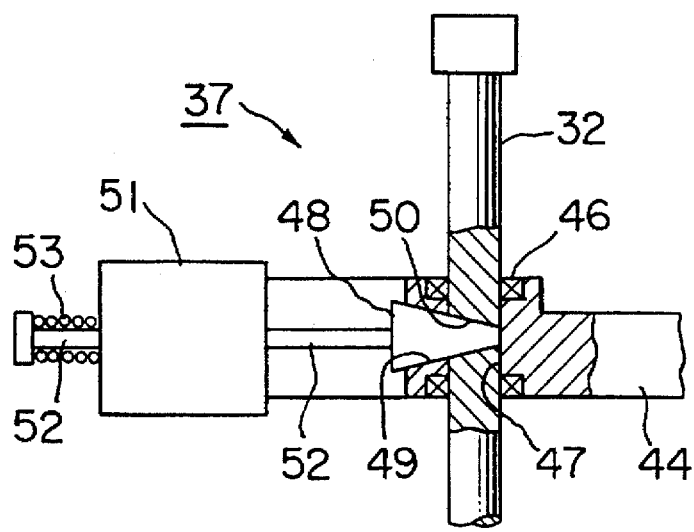
FIG. 3 is a partial vertical sectional side view of the emergency shut-off valve device of FIG. 2 in a state in which the lock pin of the drive unit is engaged in the lock pin hole.

The solenoid 51 has a drive shaft 52 horizontally passed therethrough. The lock pin 48 is disposed on one end of the drive shaft 52, opposed to the lock pin hole 49 in the output arm 44. On the other end of the output arm 52 there is disposed a coil spring 52 which urges the lock pin 48 away from the lock pin hole 49. As shown in FIG. 3, the solenoid 51 in its energized state holds the lock pin 48 against an urging force of the coil spring 53 at a locking position where the lock pin 48 is engaged in the lock pin hole 49, 50. When the power source is turned off in a power failure or an emergency, the de-energized lock pin 48 is withdrawn by an urging force of the coil spring (compression spring) 53 out of the lock pin hole 49, 50.

In place of the solenoid 51, a single acting air cylinder can be used.

Then, the operation of the first embodiment will be explained. As shown in FIG. 1, nitrogen gas is fed into reaction tube 4 of the low pressure heat treatment furnace 1 through the inlet port 8 while the interior of the reaction tube 4 is evacuated at the outlet port 9 through the exhaust system 18, and the interior of the reaction tube 4 is replaced by nitrogen gas. Then the cap body 13 is opened, and the wafer boat 15 holding semiconductor wafers W is loaded into the reaction tube 4.

Subsequently with the valve of the processing gas supply system at the inlet port 8 closed, the interior of the reaction tube 4 is exhausted and evacuated to a vacuum state through the exhaust system 18. At this time, for preventing scattering of particles in the reaction tube 4, the pulse motor 43 is actuated to open a little the valve body 28 of the valve device 20 in FIG. 2 from its closed valve position, and slow vacuum is conducted to, e.g., about 10 Torr through the fine control gap 31. Then the valve body 28 is fully opened to evacuate the interior of the reaction tube 4 to, e.g., about 0.5 Torr.

When this evacuation is over, the pulse motor 43 is actuated to close the valve body 28. In this state, the valve of the processing gas supply system at the inlet port 8 is Gradually opened to feed processing gases into the reaction tube 4 through the inlet port 8. Thus when a pressure in the reaction tube 4 reaches a treatment pressure, e.g., about 400 Torr, the pulse motor 43 is actuated to open the valve body 28 to retain the interior of the reaction tube under the above-described treatment pressure by low evacuation control through the fine adjustment gap 31. Then when the semiconductor wafers W have been treated, the evacuation of the interior of the reaction tube and the replacement thereof with nitrogen gas are conducted in the sequence opposite to the above-described one to establish the normal pressure in the interior of the reaction tube 4, and then the lift mechanism 14 is actuated to lower the cap body 13 and unload the wafer boat 15 out of the reaction tube 4.

The above-described opening/closing control of the valve body 28 is effected by controlling the pulse motor of the drive unit 36 by the controller 23 in FIG. 1 so that the valve rod 32 is interlocked with the output arm 44 moved by rotation of the screw rod 39 through the lock pin 48 in its lock position. In the operative state with the valve body 28 opened, when an emergency in which the power source is turned off due to a power failure or an abnormality, and the operation is forcedly stopped, the solenoid 52 of the interconnection releasing mechanism 37 is dienergized. And the lock pin 48 in its lock position is withdrawn by an urging force of the coil spring 53 out of the lock pin hole 49, 50. Thus the valve rod 32 is released from the output arm 44, and the valve body 28 is pushed downward by an urging force of the coil spring 33 to close the valve. The exhaust system 18 of the low pressure heat treatment furnace 1 is instantaneously shut off.

Thus according to the emergency shut-off valve device 20 involved in the first embodiment, the valve body 28 is opened/closed against an urging force of the coil spring 33 as the urging means by the drive unit 36 through the valve rod 32, and in an emergency the interconnection between the drive unit 36 and the valve rod 32 is released by the interconnection releasing mechanism 37, and the valve body 28 is automatically and quickly closed by the coil spring 33. Thus, the valve device is a pressure control valve, and in an emergency can instantaneously shut off the exhaust system 18 of the low pressure heat treatment furnace 1. Accordingly it is not necessary to separately provide an air pressure emergency shut-off valve in the exhaust system, as has been conventionally necessary, which can reduce equipment cost and equipment spaces. At the same time, the exhaust system 18 can have low piping resistance, and can drastically improve operational efficiency.

According to the interconnection releasing mechanism involved in the first embodiment, as shown in FIG. 2, the valve rod 32 is connected to the drive unit 36 through the lock pin 48. Accordingly the valve rod 32 is interlocked integrally with the drive unit 36, and in an emergency the lock pin 48 is withdrawn by the solenoid 51 to release the interconnection between the valve rod 32 and the drive unit 36. Thus, normally the drive force can be transmitted without failure from the drive unit 36 to the valve rod 32, and an emergency the valve rod 32 can be disengaged from the drive unit. Highly reliable emergency shut-off valve device 20 can be provided.

Figure 4:
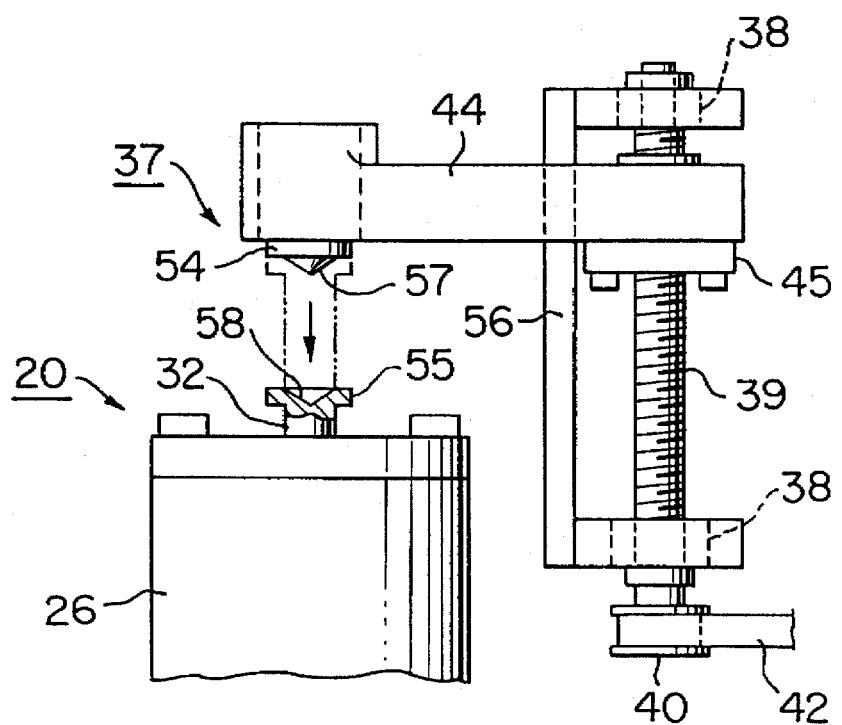
FIG. 4 is a side view of a variation of the emergency shut-off valve device of FIG. 2.

FIG. 4 is a variation of the emergency shut-off valve device for use in low pressure heat treatment furnace. The internal structure of the valve casing and the structure of the drive unit of this variation are substantially the same as those of the first embodiment. Common parts with the first embodiment are represented by common reference numerals not to repeat their explanation. This variation uses as the interconnection releasing mechanism 37 an electromagnet 54 which attracts the upper end of the valve rod 32 and, in an emergency, is de-energized to release the upper end of the valve rod 32.

That is, the electromagnet 54 is disposed on the output arm 44, opposed to the upper end of the valve rod 32, and a part-to-be-attracted 55 of a magnetic material is formed on the upper end of the valve rod 32 so as to be attracted to the electromagnet 54 when energized. An output arm 44 is supported so as to be moved by a guide 56 in the axial direction of the valve rod 32. A conical projection 57 is formed on the lower end of the electromagnet 54, and a conical concavity 58 for the projection 57 to be engaged into is formed in the part 55 on the upper end of the valve rod 32.

In the valve device 20 according to this variation having the above-described structure, the upper end of the valve rod 32 is attracted by the energized electromagnet 54 of the drive unit 36, whereby the valve rod 32 is interlocked with the drive unit, and, in an emergency, the electromagnet 54 is de-energized, and releases the upper end of the valve rod 32 as shown in FIG. 4. Thus, normally the drive force can be transmitted without failure from the drive unit 36 to the valve rod 32, and in an emergency the valve rod 32 can be quickly separated from the drive unit 36. The same effect as in the first embodiment can be achieved. In addition, the interconnection releasing mechanism 37 comprises the electromagnet 54 which directly attracts the upper end of the valve rod 32, which can make the structure simple and reduce fabrication costs.

The present invention is not limited to the above-described embodiment and can be modified and varied within the scope of the present invention. For example, in the variation of FIG. 4, the upper end portion of the valve rod extended outside the valve casing 26 is attracted by the electromagnet 54. But, for example, it is also possible that the valve rod 32 is divided, inside the valve casing, in a valve rod on the side of the valve body 28, and a valve rod on the driven side, which is directly connected to the output arm 44 of the drive unit 36, and an electromagnet for attracting the upper end of the valve rod on the side of the valve body is provided on the lower end of the valve rod on the driven side (not shown).

As means for urging the valve body 28 in the valve closing direction, in place of the coil spring, a hydraulic cylinder. An air cylinder, air cushion or the like is preferred from the viewpoint that they are not affected by power failures. In such case, an air cylinder or an air cushion may be provided on, e.g., the upper end of the valve casing 26 for urging the valve rod 32 in the valve closing direction. The low pressure heat treatment furnace 1 may not have the inner tube 5. It is possible that the heat treatment furnace can conduct treatments other than CVD, such as oxidation, diffusion, annealing, etc. The heat treatment furnace may be of the normal pressure or positive pressure.

A second embodiment of the present invention will be explained with reference to the drawings attached hereto. A low pressure heat treatment furnace using an opening variable valve device according to the second embodiment is the one shown in FIG. 1, and its explanation is not repeated.

Figure 5:
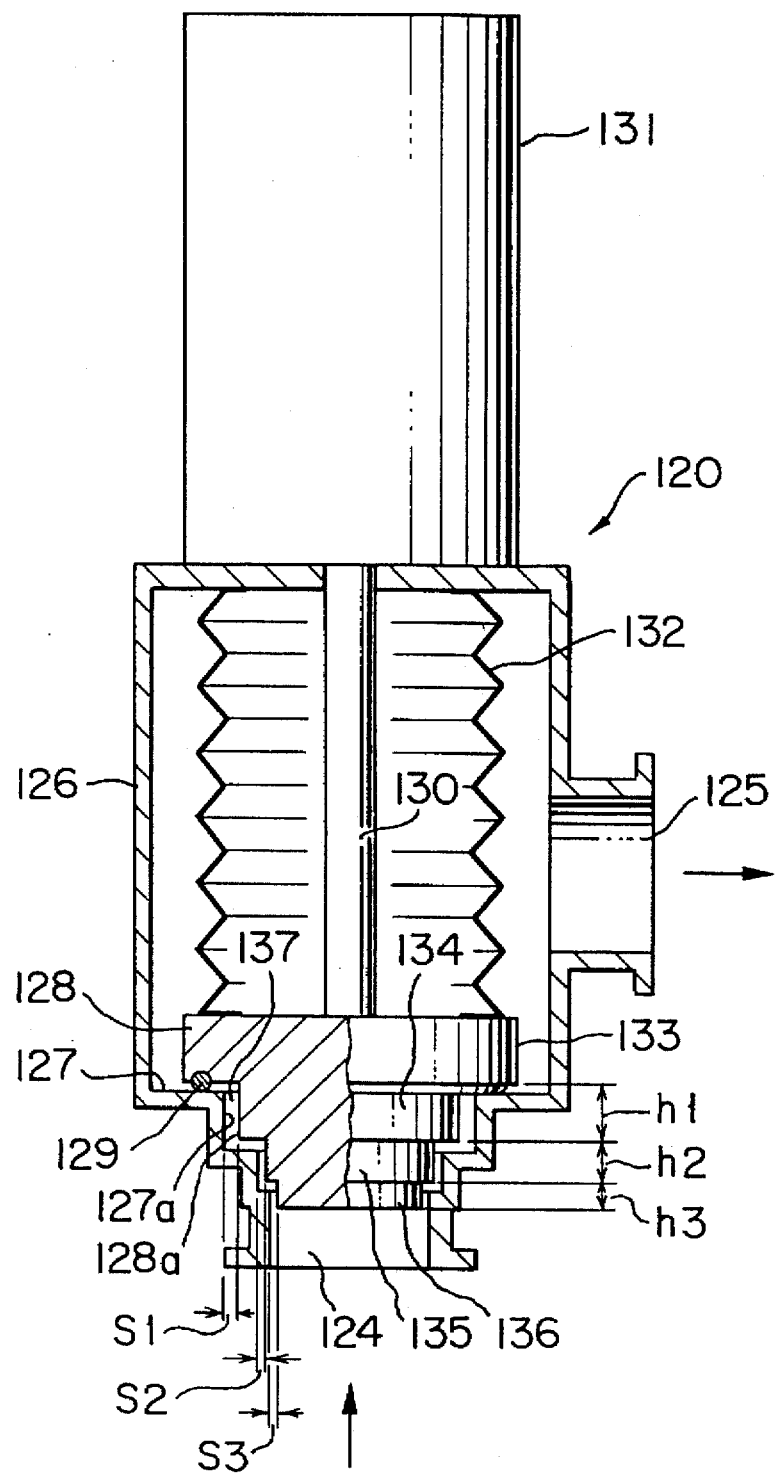
FIG. 5 is a partial vertical sectional view of the opening variable valve device according to a second embodiment for use in the heat treatment apparatus of FIG. 1.

As shown in FIG. 5, the variable opening valve device 120 used in the second embodiment includes a valve casing 126 in the shape of the so-called angle valve having an inlet port 124 for exhaust in the lower end thereof and an outlet port 125 in a side thereof. A flat valve seat 127 is formed in the valve casing 126 at an inner part of the inlet port 124. A valve body 128 is provided vertically movably to be rested on the valve seat 127 and left from the same. The valve casing 126 and the valve body 128 are formed of a heat resistance and corrosion resistant material, e.g., stainless steel. An O-ring 129 of, e.g., fluoro-rubber is provided as sealing means on a part of the valve body 128 to be rested on the valve seat 127.

A valve rod 130 is erected at the center of the upper surface of the valve body 128. On the top of the valve casing 126 there is provided a valve drive unit 131 comprising e.g., a pulse motor and a screw feed mechanism, etc. as drive means for resting/leaving the valve body 128 on and from the valve seat 127 through a part of the valve rode 130 passed through the upper end of the valve casing. A bellows 132 of stainless steel is provided by welding between the upper end of the valve body 128 ad the upper end of the interior of the valve chamber 126, enclosing the valve rod 132 and the coil spring 133 as means which allows displacement of the valve body 128 but seals the part where the valve rod 32 is passed through.

The valve body 128 has circular section and, as shown in FIG. 5, has diameters reduced downward in steps. The valve seat 127 also has diameters reduced in steps toward the entrance corresponding to a shape of the valve body 128. The underside of the uppermost maximum diameter of the valve body 128 is to be opposed to the upper surface of the valve seat 127, and an O-ring 129 is provided between the two. Reduced diameter-portions are provided in a plurality of steps below the uppermost maximum diameter portion and formed in three steps of an upper step 134, a middle step 135 and a lower step 136 in the second embodiment.

In the reduced diameter-portions of the valve body 128 and the valve seat 127 a circumferential wall 128a and a circumferential wall 127a are formed opposed to each other in the direction normal to that of movement of the valve body 128. A pair of these circumferential walls 128a, 127a increase their diameters in the valve opening direction (upward) of the valve body 128. A gap 137 for fine adjustment of evacuation is provided between the circumferential walls 128a, 127a. When sizes of the fine adjustment gap 137 of the respective steps in the direction of movement of the valve body 128, i.e., heights of the respective steps, are represented by h1, h2 and h3, h1>h2>h3 so that a size of the upper step having a larger diameter has a larger size than the lower step 136 having a smaller diameter. When sizes of the fine adjustment gaps 137 in the respective steps 134, 135, 136 are represented by S1, S2, S3, S1>S2>S3 so that a size of the upper step 134 is larger than that of the lower step 136.

A conductance of a vacuum pressure in the fine adjustment gap 137 is proportional to a cross-sectional area of the gap 137 and inversely proportional to a size of the gap 137. When the valve body 128 is gradually opened from its valve closing position (see FIG. 5), a pressure in the valve casing 126 is dominated first by the gap 137 in the lower step of a smallest cross-sectional area, next by the gap 137 in the middle step 135 and then by the gap 137 of the upper step 134.

Thus, owing to the fine adjustment gap 137 between the circumferential walls 127a, 128a, low evacuation control for exhaust can be conducted in a relatively wide range, e.g., 200–760 Torr. In the second embodiment, to further widen the range, sizes of the gap 137 are set to be S1>S2>S3. But the gap 137 may have a uniform size, i.e., S1=S2=S3, because a cross-sectional area of the gap 137 increases in proportion to a diameter. Pressure control between medium evacuation and high evacuation is conducted by displacing the valve body 128 between a position of the valve body 128 where a cross-sectional area between the valve body 128 and the valve seat 127 exceeds that of the fine adjustment gap 137 of the upper step 134, and a maximum opening position (lower in the valve casing 126 (about ⅔ a distance from the valve seat surface)). At a maximum opening, evacuation to, e.g., about 3×10$^{-3}$ Torr is possible depending on a capacity of the evacuation pump 121.

Then, the operation of the second embodiment will be explained. As shown in FIG. 1, nitrogen gas is fed into the reaction tube 4 of the low pressure heat treatment furnace 1 through the inlet port 8 while the interior of the reaction tube 4 is evacuated at the outlet port 9 through the exhaust system 18, and the interior of the reaction tube 4 is replaced by nitrogen gas. Then the cap body 13 is opened, and the wafer boat 15 holding semiconductor wafers W is loaded into the reaction tube 4 together with the heat insulating cylinder.

Subsequently with the valve of the processing gas supply system at the inlet port 8 closed, the interior of the reaction tube 4 is exhausted and evacuated to a vacuum state through the exhaust system 18. At this time, for preventing scattering of particles, the valve drive 131 is actuated to open the valve body 128 of the opening variable valve device 120 a little from the valve closing position in FIG. 5, and slow vacuum is conducted to, e.g., about 10 Torr through the fine control gap 137. Then the valve body 128 is fully opened to evacuate the interior of the reaction tube 4 of FIG. 1 to, e.g., about 0.5 Torr.

When this evacuation is over, the valve drive unit 131 is driven to close the valve body 128. In this state, the processing gas supply system is gradually opened to feed processing gases into the reaction tube through the inlet port 8, and when a treatment pressure for the semiconductor wafers W, e.g., 400 Torr is established in the reaction tube 4, the valve 128 is opened to maintain the above-described treatment pressure in the reaction tube by low evacuation control through the fine adjustment gap 137. Then when the treatment on the semiconductor wafers W is over, the evacuation of the interior of the reaction tube, and replacement thereof with nitrogen gas are conducted oppositely to the above-described sequence, and then the cap body 13 is lowered to unload the wafer boat 15.

According to the variable opening valve device 120 of the above-described structure, the state in which the valves body 128 is rested on the valve seat 127 (the valve is closed), the state in which the valve body 128 is apart from the valve seat 127 (the valves is opened), the state in which the valve body 128 is displaced within a stroke of the fine adjustment gap 137 (slow vacuum and low evacuation control), and the state in which the valve body 128 is displaced outside the stroke of the fine adjustment gap can be easily available. Thus, a single valve can not only open/close the exhaust system 18, but also make a wide range of control including the high evacuation, slow vacuum and low evacuation. Accordingly it suffices to dispose a single variable opening valve device 120 in the pipe 19 of the exhaust system 18 in place of the conventionally required main opening/closing valve, main pressure control valve, bypass pipe, auxiliary opening/closing valve and auxiliary pressure control valve. As a result, equipment costs and equipment spaces can be decreased, and the control can be simplified.

As another result, the pipe 19 in FIG. 1 can be shortened, which drastically improve operational efficiency. Furthermore, the circumferential walls 128a, 127a are diametrically expanded in steps in the valve opening direction, and a size of the fine adjustment gap 137 in the direction of movement of the valve body 128 is larger in the upper step 134 of a larger diameter than in the lower step 136 of a smaller diameter, whereby a control range of the low evacuation control is increased, and subtle pressure control can be made suitably for treatments.

FIGS. 6 to 9 show variations of the structure of evacuation fine adjustment gap 137 of the variable opening valve device for use in a low pressure heat treatment furnace.

In the valve device 120 of FIG. 6, the inner circumferential edge of the valve seat 127 is formed upright, and an annular groove 139 is formed in the bottom of the valve body 128 for receiving the upright annular projection 138. An O-ring 129 is provided on the bottom circumferential edge outer of the annular groove 139 in the valve body 128. Fine adjustment gaps 137 are defined each between one 139a of the circumferential walls of the groove 139 and the inner circumferential wall 138a of the projection 138, and between the other 139b of the circumferential walls of the groove 139 and the outer circumferential wall 138b of the projection 138.

In the valve device 120 of FIG. 7, a projection 138 is formed thick, and a valve seat 127 is provided by the upper surface of the projection 138. An O-ring 129 is provided on the bottom of the valve body 128 opposed to the valve seat 127. An annular portion 140 is formed in the bottom peripheral edge of the valve body 128 for surrounding the outer circumferential wall 138b of projection. A fine adjustment gap 137 is defined between the inner circumferential wall 140a of the annular portion 138.

In the valve device 120 of FIG. 8, a valve seat 127 is provided by a circular cavity 141 formed in the inside bottom of a valve casing 126 conically with a central entrance 124. A valve body 128 is to be received in the capacity 141 and rested on the valve seat 127. A fine adjustment gap 137 is defined between the inner circumferential wall 141a of the cavity 141 and the outer circumferential wall 128a of the valve body 128.

Figure 9:
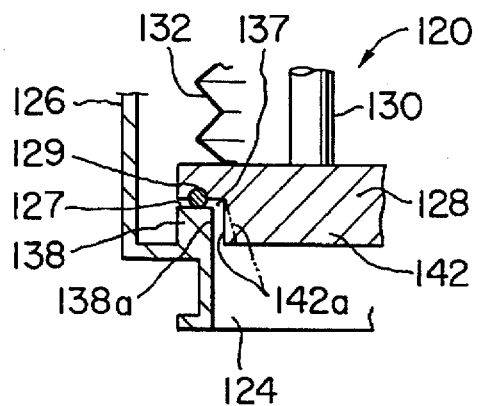
FIG. 9 is a partial vertical sectional view of a different variation of the evacuation fine adjustment gap of the opening variable valve device of FIG. 5.
Figure 10:
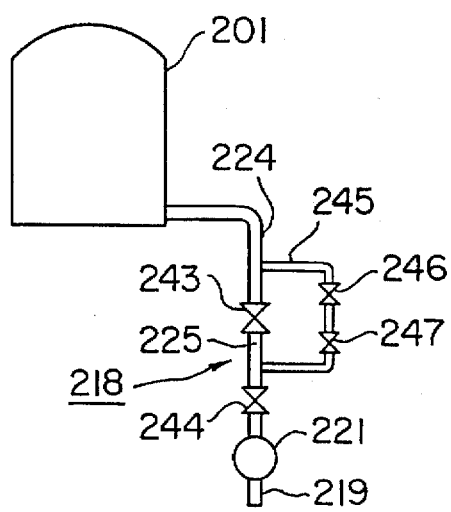
FIG. 10 is a diagrammatic view of one example of the valve device for use in the exhaust system of the conventional low pressure heat treatment furnace.
Figure 11:
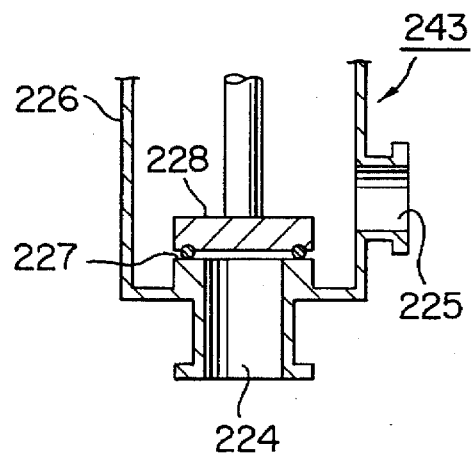
FIG. 11 is a vertical sectional view of a major part of one example of the conventional opening/closing valve.

In the valve device 10 of FIG. 9, similarly with the variation of FIG. 7, the upper surface of a projection 138 provides a valve seat 127. A valve body 128 has a circular convexity 142 which is to be received inside the projection 138. A fine adjustment gap 137 is defined between the outer circumferential wall 142a of the convexity 142 and the inner circumferential wall 138a of the projection 138.

The variable opening valve device 120 including the variations of FIGS. 6 to 9 can produce the same advantageous effects as the device according to the second embodiment except that the former has a narrower control range of the low evacuation control than the latter including the multi-step fine adjustment gap 137.

It is possible that at least one of the circumferential walls, e.g., 142a, 138a (see FIG. 9) opposed to each other in the direction normal to that of movement of the valve body 128 is so inclined that the fine adjustment gap 127 has a gradually increasing cross-sectional area as the valve body 128 is moved to open the valve. For example, in the variable opening valve device including the variation of FIG. 9, the outer circumferential wall 142a of the convexity may be tapered as indicated by the phantom line. As the valve body 128 is moved to open, the fine adjustment gap 137 gradually increases its cross-sectional area in the valve opening direction, whereby the low evacuation control can have a wide range of pressure control with small displacements of the valve body 128. The device can be smaller-sized.

The present invention is not limited to the above-described embodiments and variations, and covers modifications and variations with the scope of the present invention. For example, the low pressure heat treatment furnace 1 may not include the inner tube 5, and may be for, oxidation, diffusion, annealing, etc. other than low-pressure pressure CVD.

What is claimed is:

1. A heat treatment apparatus having a reduced pressure exhaust valve with an automatic remote control device and an emergency shut-off device, said reduced pressure exhaust valve comprising:

a valve body to be rested on a valve seat in a valve closing direction and to be lifted from the valve seat in a valve opening direction by sliding of a valve rod in gas tight manner through a valve casing, an urging means for urging said valve body in the valve closing direction, an electric drive means for opening/closing said valve body through said valve rod against an urging force of the urging means, and an interconnection releasing means disposed between the electric drive means and said valve rod for bringing said valve rod and the electric drive means into interconnection with each other, and for releasing the interconnection in an emergency to close said valve body, the interconnection releasing means includes lock pin holes formed both in the electric drive means and the valve rod, a lock pin to be engaged into said lock pin holes, a solenoid which drives the lock pin, and a control means for deenergizing the solenoid in an emergency, the interconnection releasing means disengaging the lock pin out of the lock pin holes.

2. A heat treatment apparatus having a reduced pressure exhaust valve with an automatic remote control device and an emergency shut-off device, said reduced pressure exhaust valve comprising:

a valve body to be rested on a valve seat in a valve closing direction and to be lifted from the valve seat in a valve opening direction by sliding of a valve rod in gas tight manner through a valve casing, an urging means for urging said valve body in the valve closing direction, an electric drive means for opening/closing said valve body through said valve rod against an urging force of the urging means, and interconnection releasing means disposed between the electric drive means and said valve rod for bringing said valve rod and the electric drive means into interconnection with each other, and for releasing the interconnection in an emergency to close said valve body, the interconnection releasing means includes lock pin holes formed both in the electric drive means and the valve rod, a lock pin to be engaged into said lock pin holes, a single acting hydraulic cylinder driving the lock pin, and a control means for deenergizing the single acting hydraulic cylinder in an emergency, the interconnection releasing means disengaging the lock pin out of the lock pin hole.

3. A heat treatment apparatus having a reduced pressure exhaust valve with an automatic remote control device and an emergency shut-off device, said reduced pressure exhaust valve comprising:

a valve body to be rested on a valve seat in a valve closing direction and to be lifted from the valve seat in a valve opening direction by sliding of a valve rod in gas tight manner through a valve casing, an urging means for urging said valve body in the valve closing direction, an electric drive means for opening/closing said valve body through said valve rod against an urging force of the urging means, and interconnection releasing means disposed between the electric drive means and said valve rod for bringing said valve rod and the electric drive means into interconnection with each other, and for releasing the interconnection in an emergency to close said valve body, the interconnection releasing means includes an attracting unit disposed on the electric drive means;

wherein the attracting unit attracting an end of the valve rod by an electromagnet generated thereby, and being deenergized in an emergency to release the end of the valve rod.

* * * * *